Nov. 21, 1967   L. P. HORWITZ ET AL   3,354,296
TRANSLATOR
Filed June 29, 1964   12 Sheets-Sheet 1
FIG. 1
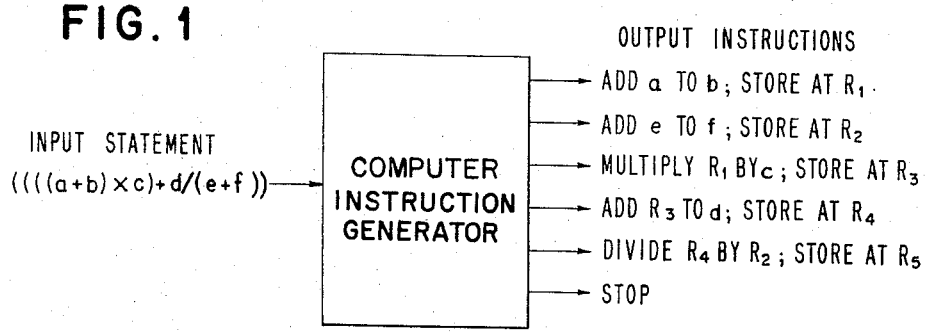
FORMAT FOR EACH TERM OF INPUT STATEMENT
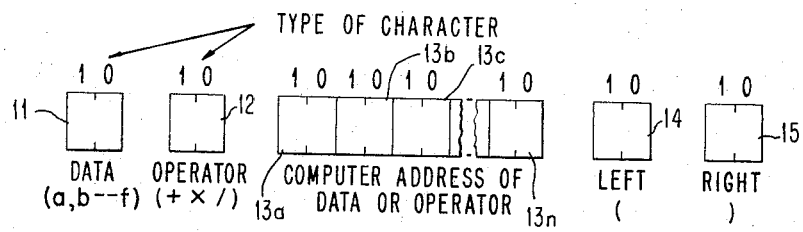
FIG. 2
FORMAT OF OUTPUT INSTRUCTIONS
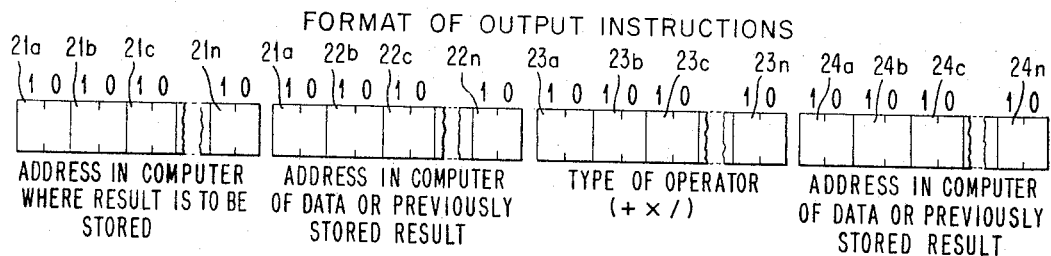
FIG. 3
| FIG. 7a | FIG. 7d | | | |
|---|---|---|---|---|
| FIG. 7b | FIG. 7e | FIG. 7g | FIG. 7h | FIG. 7i |
| FIG. 7c | FIG. 7f | | | |
FIG. 7
INVENTORS
LAWRENCE P. HORWITZ
RICHARD M. KARP
BY Edward L. Fiorito
ATTORNEY Nov. 21, 1967  L. P. HORWITZ ET AL  3,354,296
TRANSLATOR
Filed June 29, 1964  12 Sheets-Sheet 2

FIG. 4

| | INNER | ( ( ( ( - - - ) - - ) - - ) - ( - - - ) ) | |
|---|---|---|---|
| | PARENTHESIS | 1 1 1 1 0 0 0 0 0 0 0 0 0 0 1 1 0 0 0 0 0 | 1ST ROW |
| | DETECTION | 1 1 1 1 1 1 1 0 0 0 0 0 0 0 0 1 1 1 1 0 0 | 2ND ROW |

31  32  31' 32'

OPERATING STEPS

| | | EXPRESSION (1) |
|---|---|---|
| | ( ( ( ( a + b ) × c ) + d ) / ( e + f ) ) | |
| 1 | ( ( ( →(a + b)← × c ) + d ) / →(e + f)← ) | |
| 2 | ( ( →( $R_1$ × c)← + d ) / $R_2$ ) | |
| 3 | ( →( ( $R_1$ × c) + d)← / $R_2$ ) | |
| 4 | →( ( ($R_1$ × c) + d) / $R_2$ )← | |
| 5 | ( ( ($R_1$ × c) + d) / $R_2$ ) | |
| 6 | ( ( ($R_1$ × c) + d) / $R_2$) | |
| 7 | ( ( $R_3$ + d) / $R_2$) | |
| 8 | ( ( $R_3$ + d) / $R_2$) | |
| 9 | ( ($R_3$ + d) / $R_2$) | |
| 10 | ( ($R_3$ + d) / $R_2$) | |
| 11 | ( ($R_3$ + d) / $R_2$) | |
| 12 | ( $R_4$ / $R_2$) | |
| 13 | ( $R_4$ / $R_2$) | |
| 14 | ($R_4$ / $R_2$) | |
| 15 | ($R_4$ / $R_2$) | |
| 16 | ($R_4$ / $R_2$) | |
| 17 | $R_5$ | |

FIG. 5

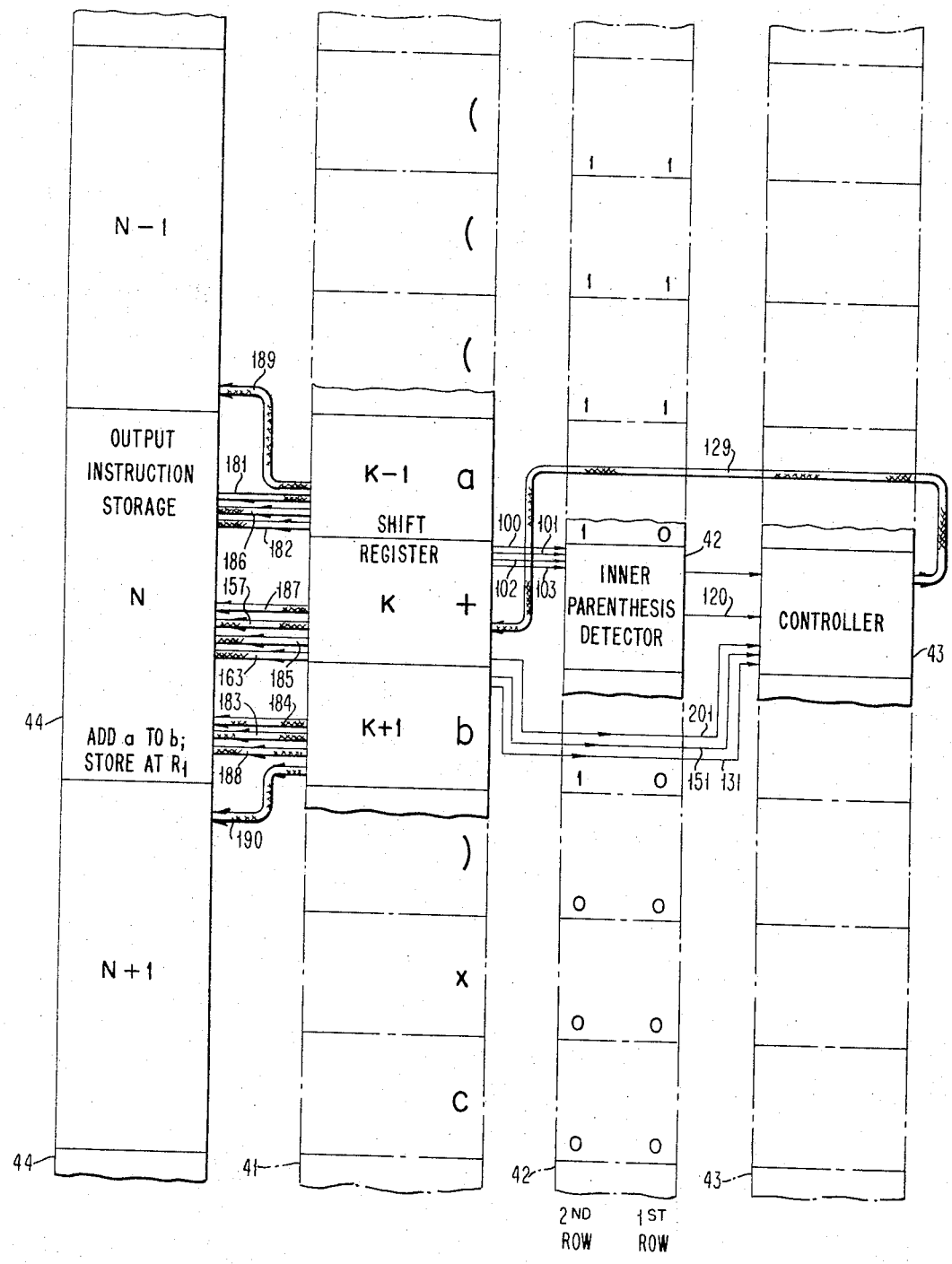

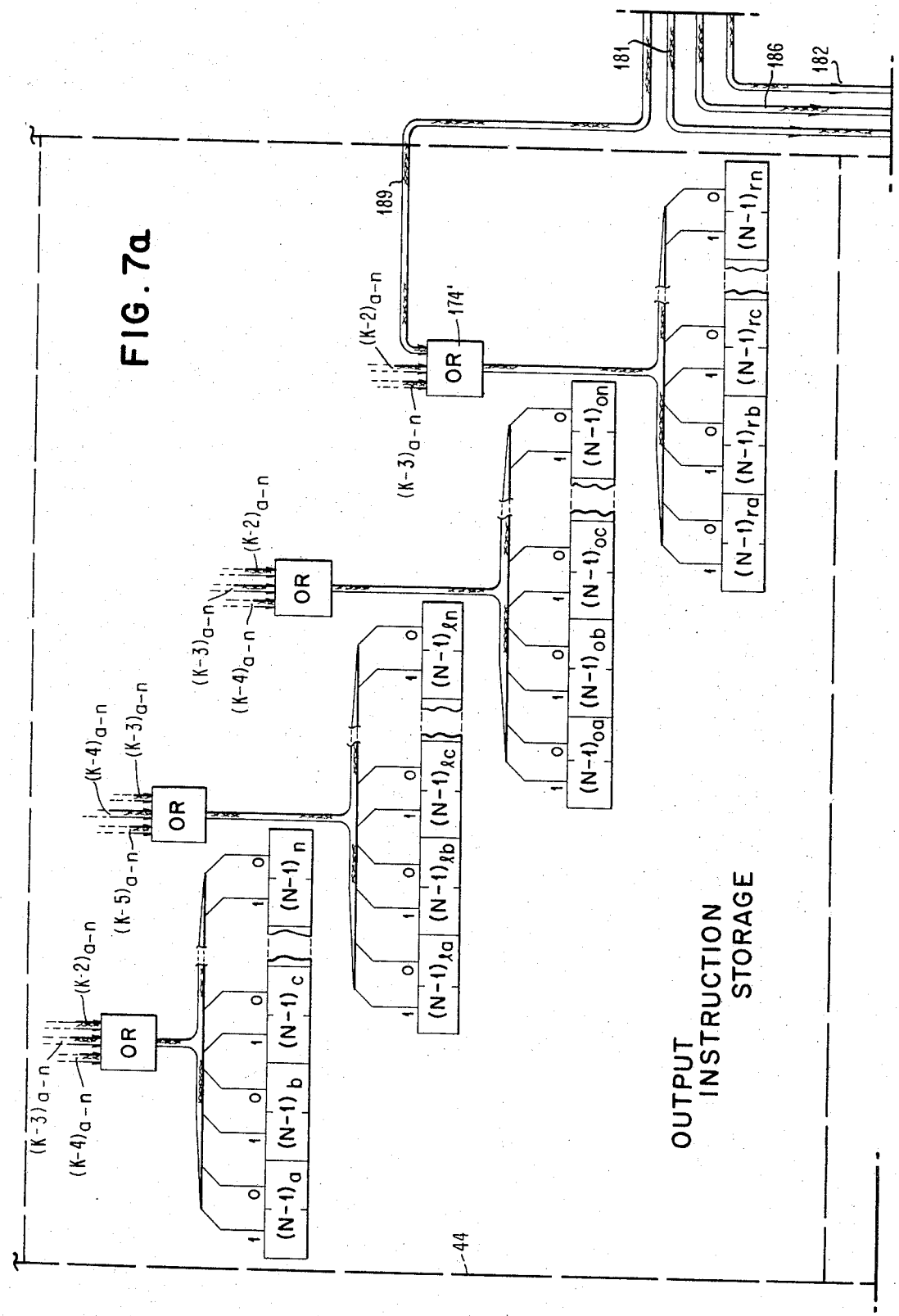

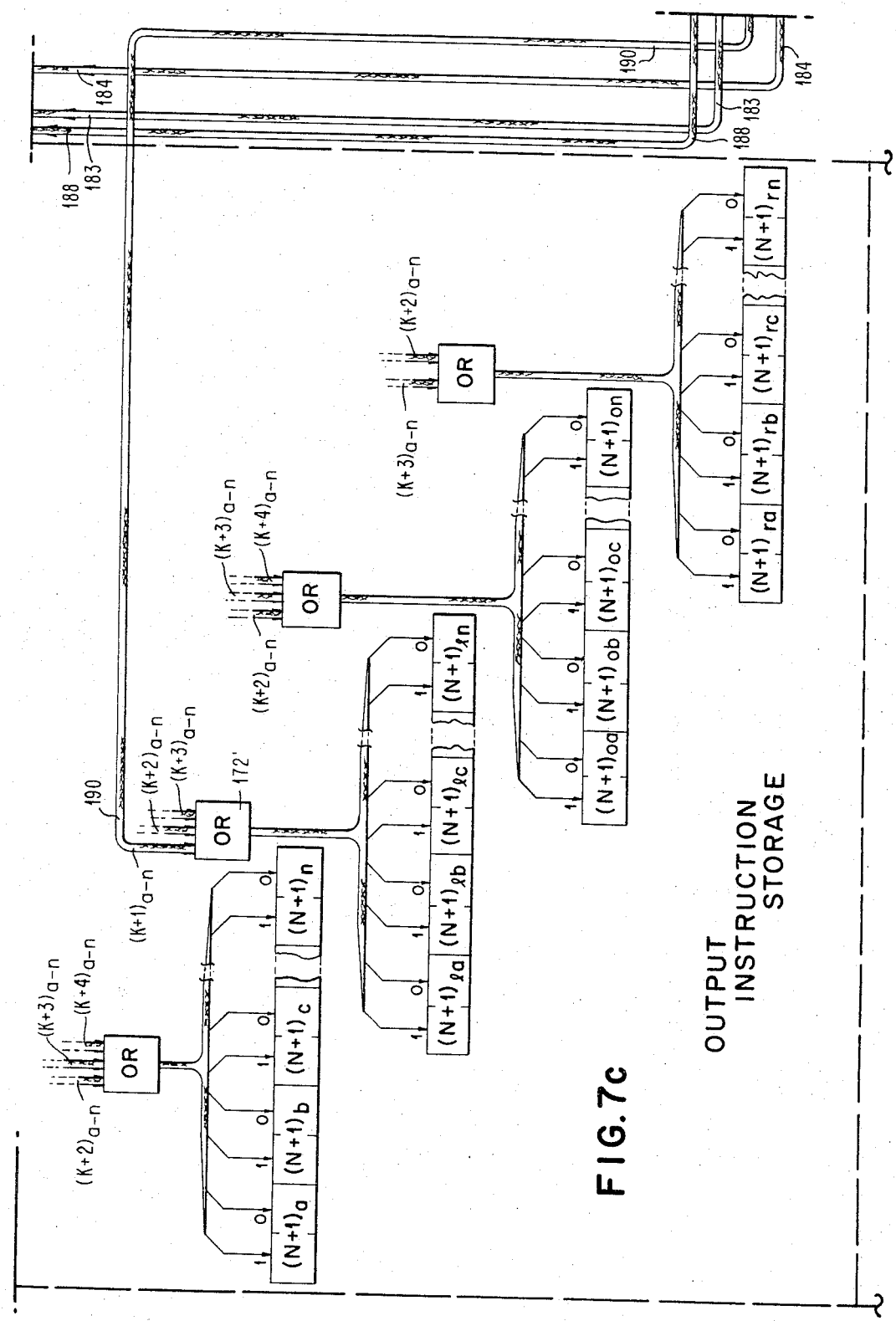

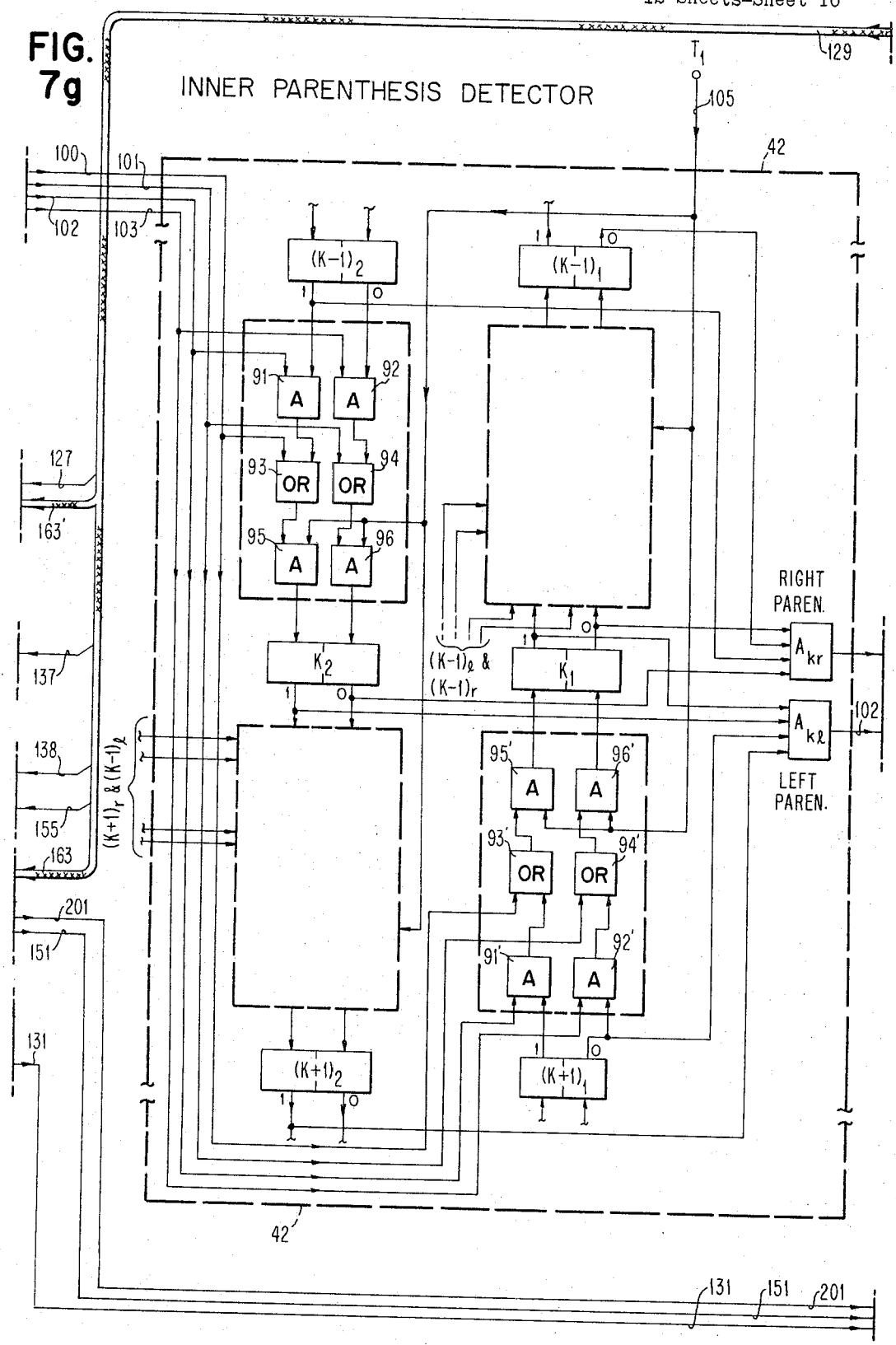

United States Patent Office 3,354,296
Patented Nov. 21, 1967

3,354,296
TRANSLATOR
Lawrence P. Horwitz, Chappaqua, and Richard M. Karp, New York, N.Y., assignors to International Business Machines Corporation, New York, N.Y., a corporation of New York
Filed June 29, 1964, Ser. No. 378,569
8 Claims. (Cl. 235—154)

ABSTRACT OF THE DISCLOSURE

The system for converting an algebraic statement into a series of computer instructions. The system comprises a shift register for storing the algebraic statement and an inner parenthesis detector for detecting pairs of inner parentheses and supplying signals to the controller means. The controller means reads out characters and an associated operator within a pair of said inner parenthesis stores them in an output instruction storage means. At the same time the shift register is cleared and a memory address $R_1$ is inserted into the shift register indicating where the results of the operation just transferred to the output instruction storage means is to be stored in memory. This operation is repeated until all pairs of parentheses have been so evaluated and operated on.

---

This invention relates to methods and apparatus for translating expressions from one form to another, and more particularly to generating computer instructions.

Computers are ordinarily controlled by instructions prepared by a programmer. The form of the computer instructions is ordinarily a complicated one differing from the conventional manner of expressing the problem to be solved by the computer. Frequently the problem is stated in the form of a mathematical expression which the programmer translates into a series of computer instructions.

One method of automatically translating the statement of the problem into computer instructions is to use the computer itself as a translator. Programs, called compiler programs, control the computer so that it performs the function of translating the input statement into a series of computer instructions. Often the compiler programs are quite involved and the time taken for translation reduces the amount of computer time available for operation upon the actual problem to be solved.

It would be desirable for a computer to accept as direct input an instruction in the form of an algebraic expression, such as:

$$((((a+b)\times c)+d)/(e+f)) \quad \text{expression (1)}$$

This expression is not in a form usable by the computer since it does not tell the computer which operation to execute first. Conventional instructions usable by the computer would call for $a$ to be added to $b$ and $e$ to be added to $f$ initially. Following this the computer would be instructed to multipfy $c$ by the results of the addition of $a$ to $b$ and then add $d$ to this product, and so forth.

An object of the present invention is to provide improved methods and apparatus for translating expressions from one form to another form more suitable for instructing computers.

Another object of the present invention is to provide improved methods and apparatus for translating algebraic expressions into a series of instructions capable of execution by a computer.

A further object of the present invention is to provide a computer instruction generator capable of translating algebraic expressions.

Still another object of the present invention is to provide a computer instruction generator capable of rapidly translating instructions in the form of algebraic statements using a minimum of hardware.

It is another object of the present invention to provide improved apparatus for detecting inner parentheses within an algebraic expression.

These and other objects of the present invention are accomplished by examining the entire algebraic expression, such as expression 1 above to determine which pairs of parentheses have only characters representing variables and operators located therebetween. Computer instructions can be generated immediately for the characters within these pairs, called inner parentheses. Substitute characters are inserted in place of the characters $a+b$ and $e+f$ identifying the place in the computer where the results of these operations are to be stored. Following this, new pairs of inner parentheses, including only characters and substitute characters, are determined.

In this manner the entire expression 1 is operated upon simultaneously and those operations available for immediate execution by the computer are provided as output instructions while translation is still in progress.

Another advantage of the present invention is the small overall time taken for translation and the relatively small amount of hardware necessary to accomplish this function.

In accordance with another aspect of the present invention a novel type of parenthesis detector circuit is employed to simultaneously locate all inner parentheses. Two rows of bistable devices are provided, each row having a number of devices equal to the number of terms of the expression 1. The bistable devices corresponding to right parentheses are set immediately into a zero state, and those devices corresponding to left parentheses are set in a one state. The remaining devices in the first row are set in a state depending upon the state of the neighboring devices on the right, while the remaining devices in the second row are set into a stable state depending upon the state of the neighboring devices on the left. By forming rows of ones and zeros in this manner a unique matrix of four ones and zeros identifies a left parenthesis, while another unique matrix of four ones and zeros identifies a right parenthesis.

The foregoing and other objects, features and advantages of the invention will be apparent from the following more particular description of a preferred embodiment of the invention, as illustrated in the accompanying drawings.

In the drawings:

FIG. 1 is a diagram illustrating an example of an input statement, expression 1, and the series of output instructions provided by the present invention;

FIG. 2 is a diagram illustrating the format for each character and parenthesis of the input statement as applied to the present invention;

FIG. 3 is a diagram illustrating the format of the output instructions provided by the present invention;

FIG. 4 is a chart illustrating the manner in which inner parentheses are detected in accordance with the present invention;

FIG. 5 is a chart illustrating the operating steps of the present invention when translating the expression 1;

FIG. 6 is a block diagram illustrating the flow of data between elements of the present invention;

FIG. 7 is a diagram illustrating the manner in which FIGS. 7a–7i are combined to form a composite drawing; and FIGS. 7a–7i illustrate a detailed embodiment of the present invention.

Figure 7B:
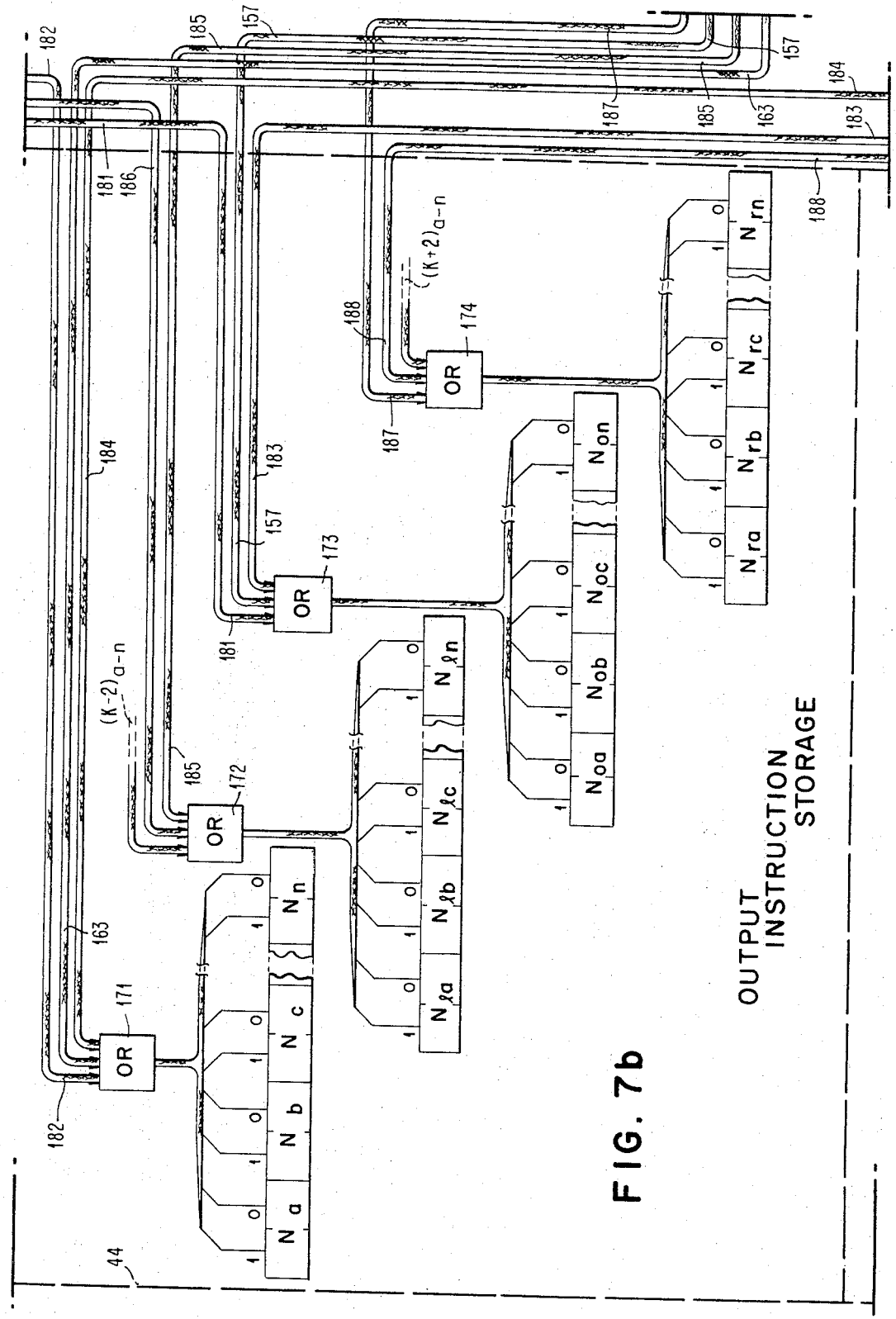

FIG. 1 illustrates the type of input statement accepted by the present invention and the form of output instructions generated. Each output instruction includes an operation, for example add $a$ to $b$, and an address where the result $R_1$ is to be stored. The address locates a specific place in the memory of a computer (not shown) which is to execute the instruction. The address of the result $R_1$ is used in later instructions. For example the third output instruction is to multiply the result stored at $R_1$ by $c$. This result is stored at $R_3$.

Each element of expression 1 is a term; for example, (, X, and $e$ are terms. Each term of the input statement is represented by a series of bits having the format shown in FIG. 2. A series of triggers 11–15 are used to store information relative to a single term of the input statement. Triggers are represented by a rectangular block having a one and zero adjacent thereto indicative of the two possible states of the triggers. Triggers 11 and 12 indicate the type of character stored (data or operator). For example if the term is a data character such as $a$, trigger 11 is set in the one state, operator trigger 12 in the zero state, and address triggers 13$a$–$n$ are set in a pattern of ones and zeros corresponding to the address in the computer memory (not shown) where the data represented by the symbol $a$ is stored. Parentheses triggers 14 and 15 are both in the zero state.

If the character is an operator, (+) for example, data trigger 11 is set in the zero state, operator trigger 12 is set in the one state and address triggers 13$a$–$n$ are set in a pattern of ones and zeros corresponding to the operator (+). A left parenthesis or a right parenthesis is represented by setting parenthesis trigger 14 or parenthesis trigger 15 in the one state, respectively.

The format of the output instructions provided by the present invention is shown in FIG. 3. Each output instruction is represented by the settings of a plurality of triggers 21–24. Triggers 21$a$–$n$ represent the address in the computer where the result obtained by execution of the instruction is to be stored. The addresses of the data or previously stored results to be operated upon in response to the instruction are stored in triggers 22$a$–$n$ and triggers 24$a$–$n$. The type of operation to be carried out is represented by the setting of triggers 23$a$–$n$.

It can be seen that the actual data values are not used by the present invention. Only the addresses of the data are manipulated, while the actual values remain stored in a computer (not shown) which executes the output instructions.

*General operation*

Prior to describing the operation of the embodiment of the present invention shown in FIGS. 6 and 7, a general description is presented in connection with the FIGS. 4 and 5. FIG. 4 illustrates expression 1 with the data and operator characters omitted since the parentheses are the only terms which need to be detected. Two rows of ones and zeros are placed under the terms of the expression. Ones are placed under the left parentheses and zeros are placed under the right parentheses. The remaining ones and zeros in the first row are determined by matching them with their neighbor or the right, while the remaining ones and zeros in the second row are made to agree with their neighbors on the left. Therefore beginning with the left hand side of the second row, the first four ones are present because they correspond to the first four left parentheses of the expression. The fifth, sixth and seventh members of the second row are ones because they must agree with their neighbor on their left. That is, the fourth member of the second row determines what the fifth member is to be; the sixth is made to agree with fifth, and the seventh with the sixth.

Once having established the two rows of ones and zeros shown in FIG. 4, all inner parentheses (those pairs of parentheses having only data or operater characters therebetween) may be detected by searching for two different and unique patterns of ones and zeros, each pattern including four ones and zeros. The first pattern is illustrated by the ones and zeros within a block 31 and a block 31'. It may be noted that this unique pattern exists only two times throughout the two rows of ones and zeros, and only where an inner left parenthesis exists. A pair of blocks 32 and 32' surround other unique patterns of ones and zeros which indicate the presence of inner right parentheses. The detection of the two pairs of inner parentheses in FIG. 4 is accomplished simultaneously without interdependence. Therefore where a plurality of pairs of inner parentheses exist in an algebraic expression, detection can be accomplished simultaneously in an interval of time not dependent upon the number of pairs of inner parentheses.

FIG. 5 illustrates the operating steps of the present invention in a general manner, using expression 1 shown at the top of FIG. 5 as an example. During the first operating step the two inner pairs of parentheses are detected and shifted one unit in the direction indicated by the arrows. The expression 1 is drawn in FIG. 5 so that each term occupies one equal unit of space. The analogy between shifting the inner parentheses one unit in the chart of FIG. 5 and the actual equivalent hardware in the present embodiment of the invention will become more apparent when the details of a shift register shown in FIGS. 6 and 7 are described.

During operating step 2, two output instructions are provided, i.e. ADD $a$ to $b$; STORE at $R_1$ and ADD $e$ to $f$; STORE at $R_2$. The data and operator characters along with their associated inner parentheses are removed from the expression and replaced with the symbol identifying the location in storage of the result, i.e., $R_1$ and $R_2$. Also occurring during operating step two is the detection of a new pair of iner parentheses, and a shift thereof one unit in the direction of the arrows. These parentheses become the new inner parentheses because the first and original inner parentheses have been removed from the expression. After the new inner parentheses are detected during operating step two, they are changed from a heavy line representation to a broken line representation at operating step three. During operating step three the left broken line parenthesis is shifted one unit while the right broken line parenthesis does not shift since it is adjacent to the data character $c$.

During steps three and four new pairs of inner parentheses are detected and shifted thereby completing the detection of all inner parentheses. The parentheses which are not adjacent to characters are shifted simultaneously during steps three and four.

During step five $R_1$ is shifted to the right along with the parenthesis adjacent thereto. In accordance with the operation of the present invention the substitute character $R_1$ is permitted to shift since there are no terms of the expression occupying the position on the right, a situation which did not exist during operating step three when character $c$ could not move to the left because of the presence of operator $(x)$. During step six $R_1$ is shifted adjacent to operator $(x)$ thereby completing a unit of adjacent characters capable of immediate execution. Therefore an instruction is generated during step six and a substitute character $R_3$ is placed in the expression at a position corresponding to the operator $(x)$. During steps seven through eleven characters and parentheses shift until another unit of characters has arrived in adjacent positions ready for execution. The process continues until the last unit of characters has arrived at adjacent positions and the final instruction is provided.

One advantage apparent from the chart in FIG. 5 is that output instructions are provided immediately when three characters are assembled in a group without waiting for the entire translation to be completed. Another advantage illustrated is that the parentheses and characters shift simultaneously toward their ultimate destinations. Once the outermost parenthesis moves, it continues without interruption or hesitation due to the manipulation of interior characters and parentheses. The operating technique illustrated in FIG. 5 provides for a short overall translation time.

FIG. 6 is a block diagram illustration of the present invention. The basic elements include a shift register 41, inner parenthesis detector 42, controller 43 and output instruction storage 44. Those portions of elements 41–44 to be shown in detail in FIGS. 7a–i are shown in full line, while the remaining portions are shown in broken line. The broken line portions of FIG. 6 are not shown in detail since they are merely repetitions of the full line portions.

Three positions of shift register 41, $K-1$, K and $K+1$ are associated with a single position (N) of output instruction storage 44. Each position of the shift register 41 is associated with a single position of the inner parenthesis detector 42 and controller 43.

In order to show the relation of the chart shown in FIG. 5 with the block diagram shown in FIG. 6, terms of the expression 1 are placed in positions of shift register 41. Shift register 41 is capable of shifting the terms up or down corresponding to left or right in the chart of FIG. 5. Position N of storage 44 is shown to include the instruction ADD $a$ to $b$; STORE at $R_1$, this instruction being received via cables connected to positions $K-1$, K and $K+1$ of shift register 41. A single position of output instruction storage 44 services three positions of shift register 41. Since each instruction includes three characters in the expression 1 only one-third as many storage positions are needed as register positions.

To show the relation between FIG. 4 and inner parenthesis detector 42, two rows of ones and zeros are placed in the positions of inner parenthesis detector 42 shown in FIG. 6. The ones and zeros placed in each position of inner parenthesis detector 42 correspond to the terms of the expressions placed in the positions of shift register 41.

In operation inner parenthesis detector 42 detects and identifies the positions of shift register 41 containing an inner parenthesis and passes this information along to controller 43. Controller 43 in response to the inner parenthesis information, and other information about the type of characters stored in positions of shift register 41, determines the direction in which the terms of the expression 1 are to be shifted in register 41, and also whether an instruction is ready to be transferred to output instruction storage 44 where it is stored until called upon to be used for controlling a computer.

*Detailed description*

Figure 7D:
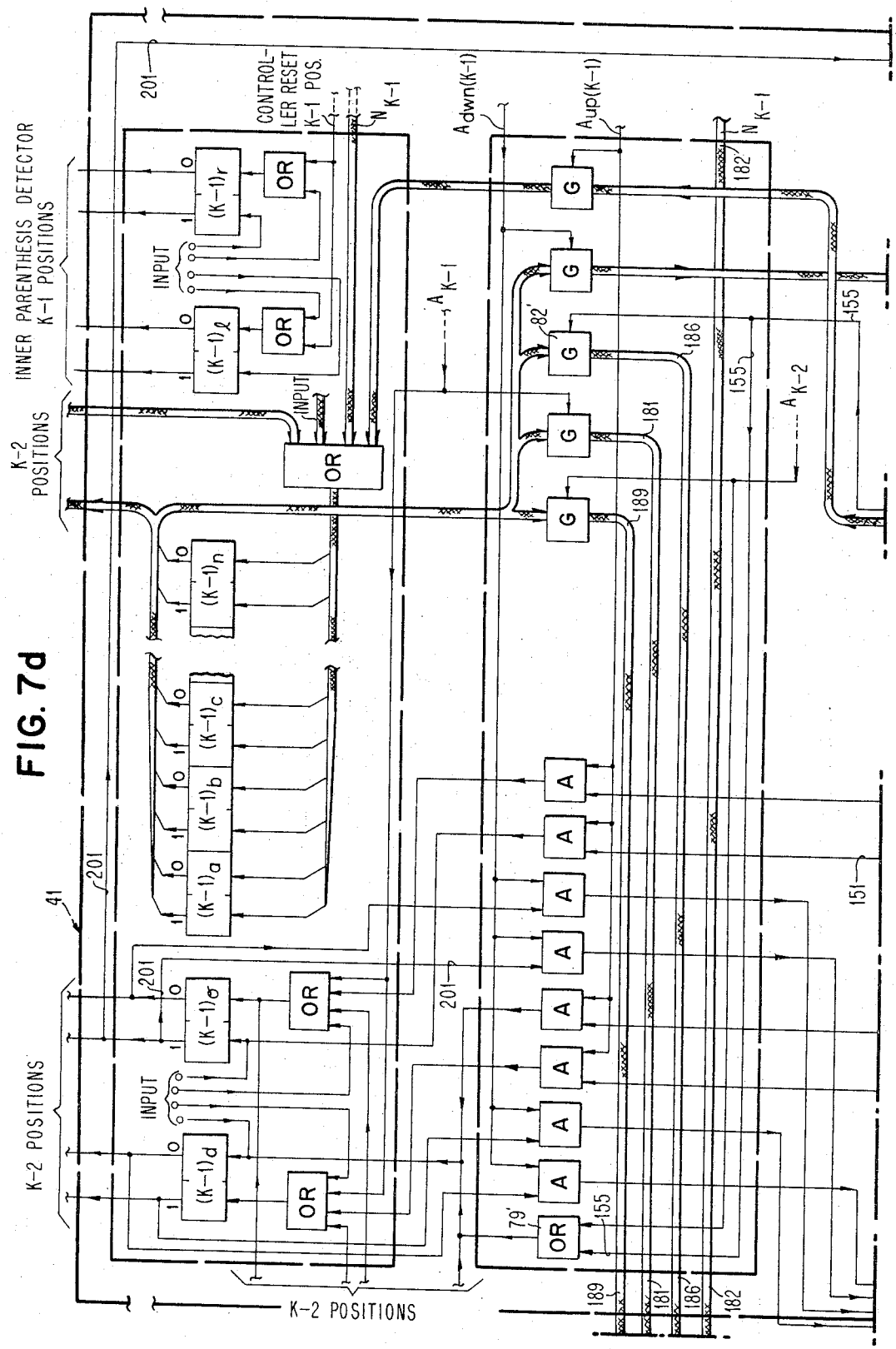
Figure 7E:
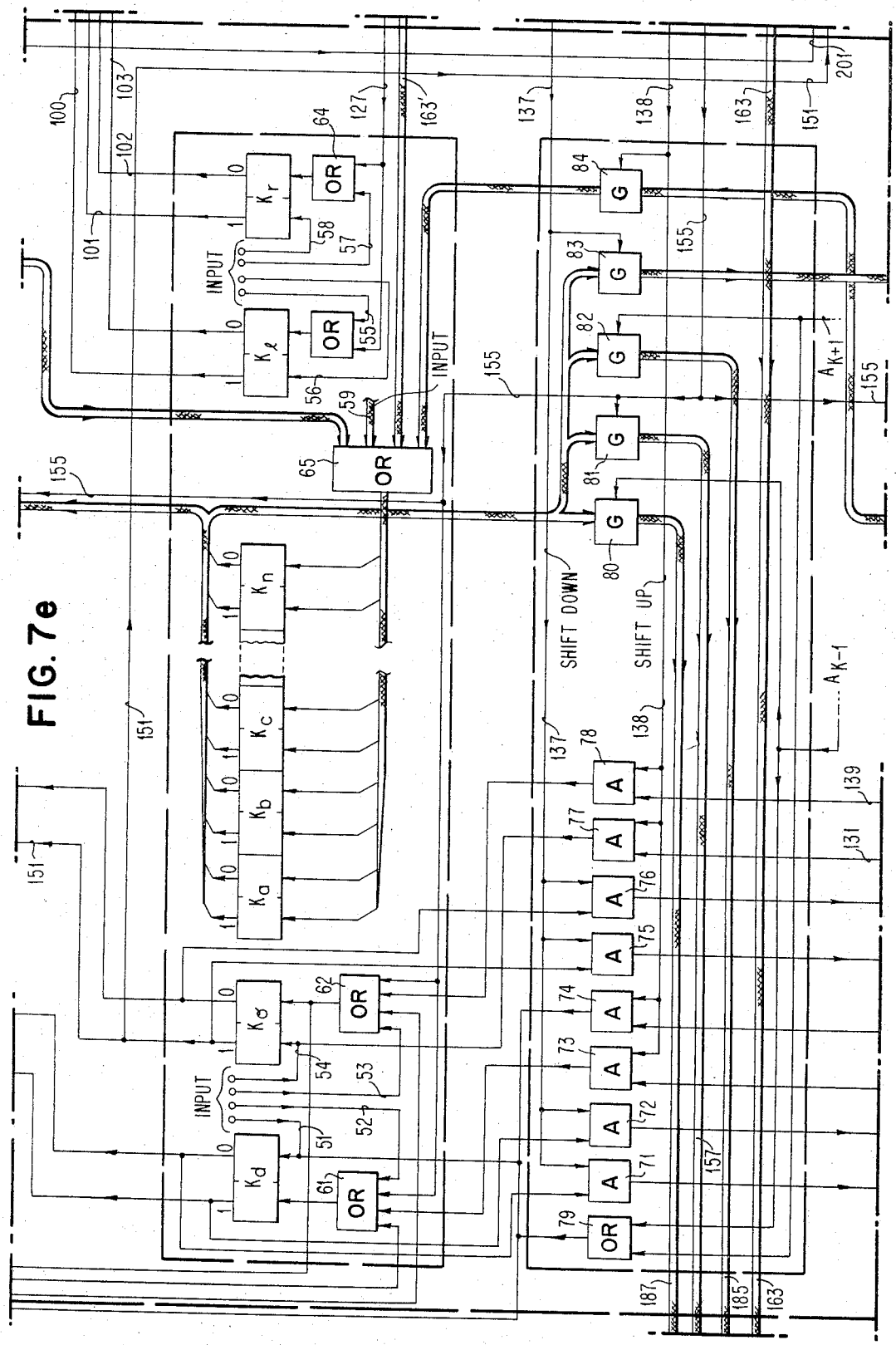
Figure 7F:
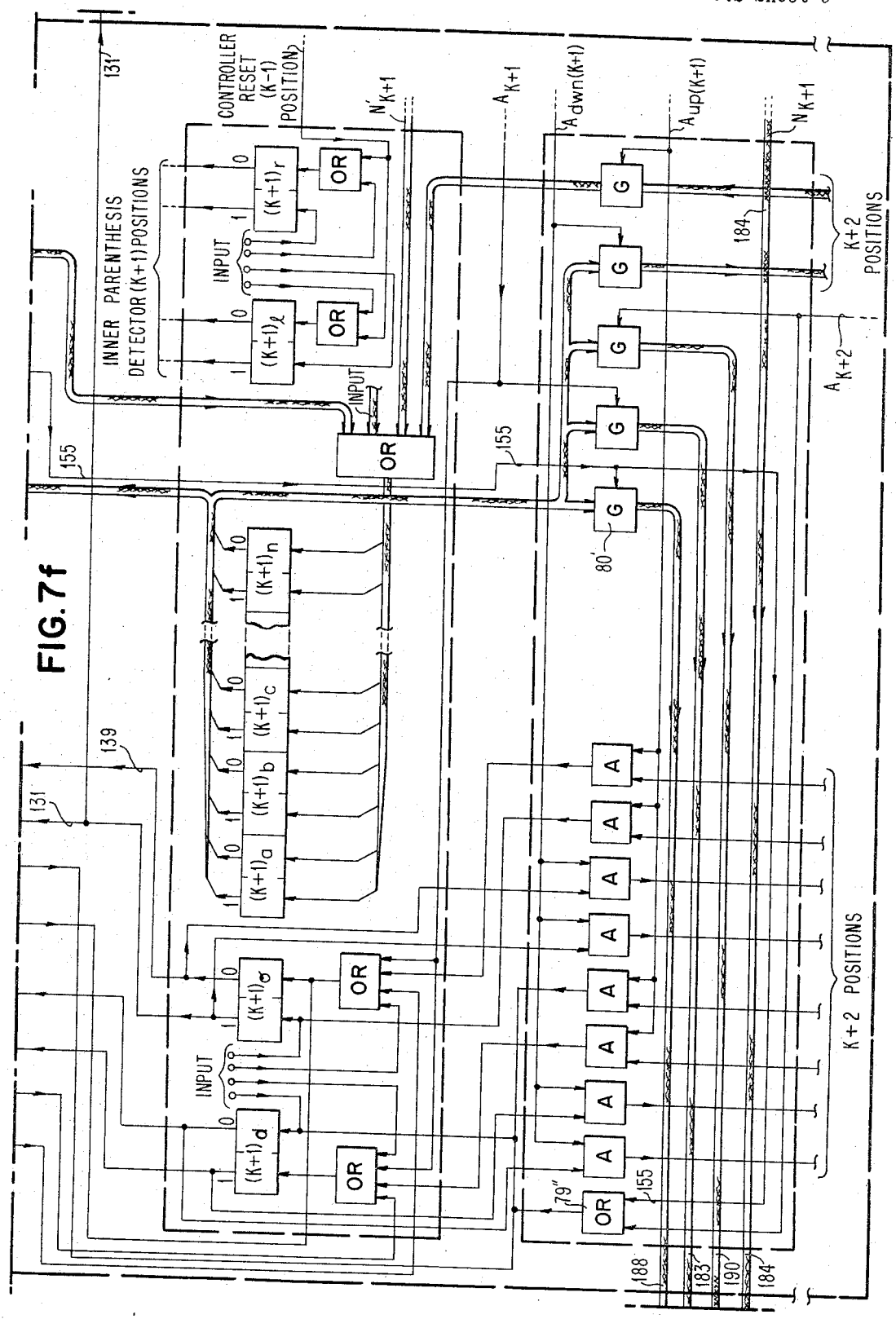
Figure 7H:
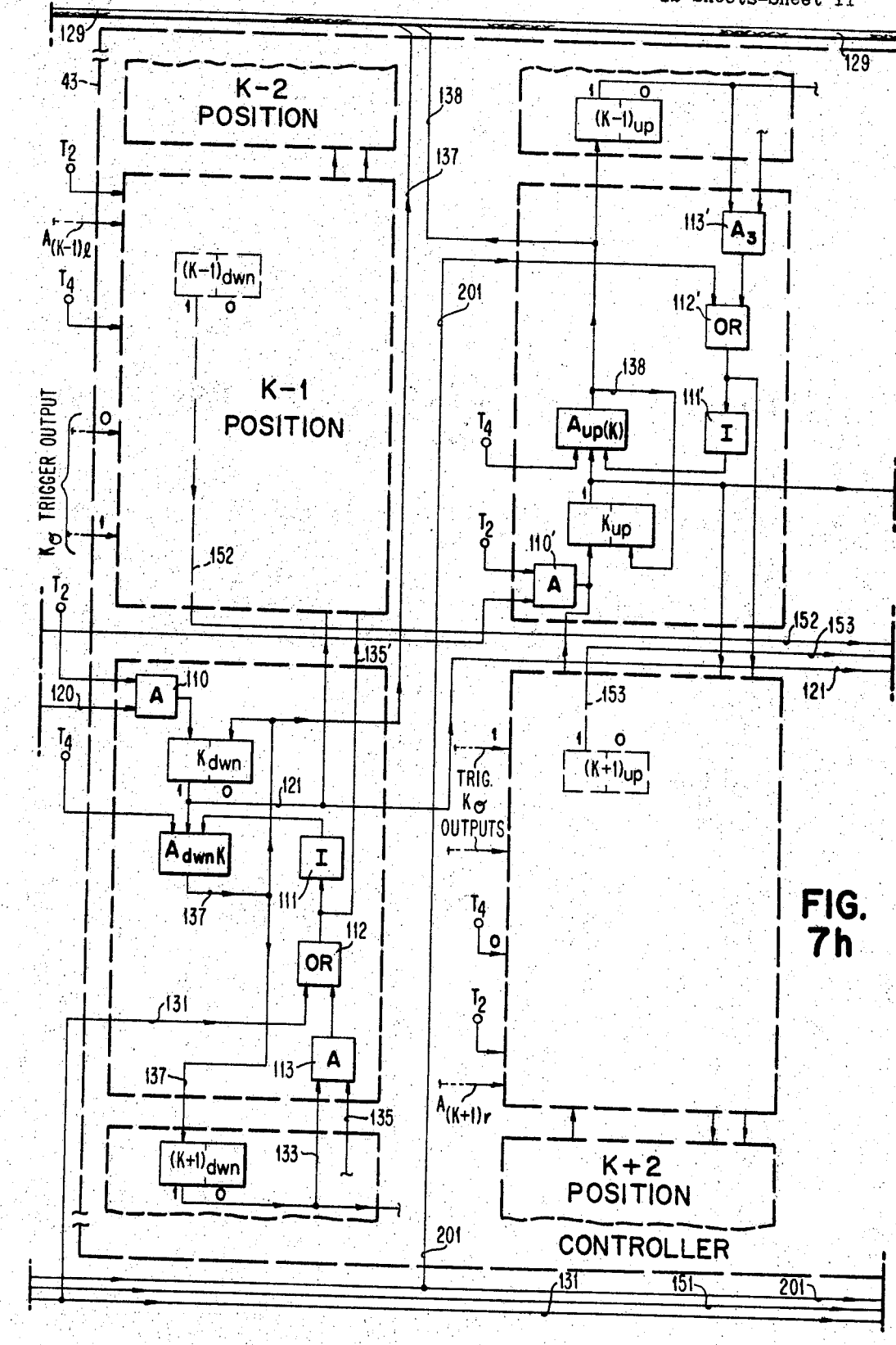
Figure 7I:
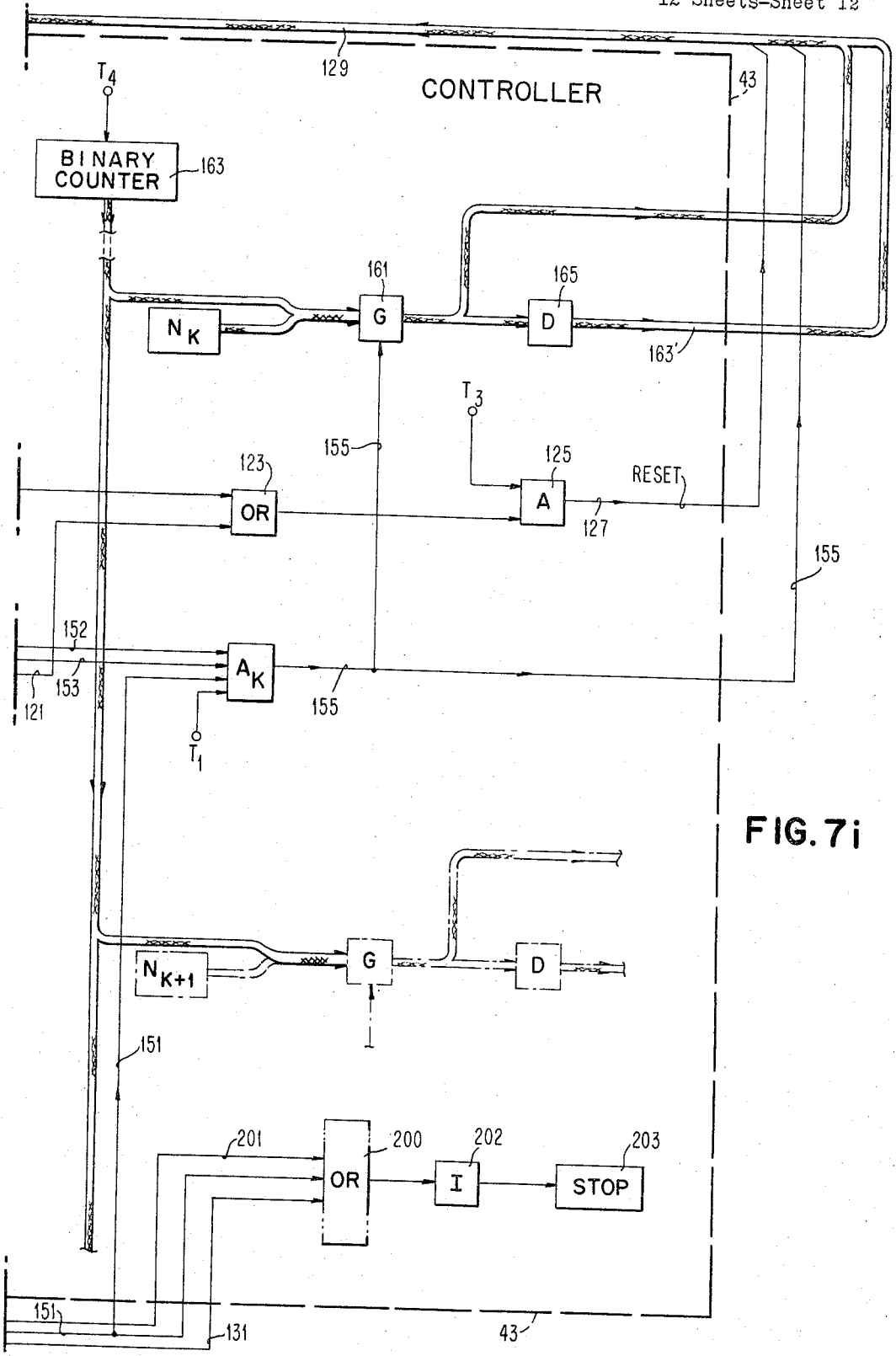

FIG. 7 illustrates the manner in which FIGS. 7a–7i are combined to form a composite drawing of the details of the present invention. Three positions, $N-1$, N and $N+1$ of output instruction storage 44 are shown in detail in FIGS. 7a–7c respectively. FIGS. 7d–7f show positions $K-1$, K and $K+1$ of shift register 41 in detail. FIG. 7g shows the details of the portion of inner parenthesis detector 42 corresponding to position K of shift register 41. Finally, FIGS. 7h and 7i illustrate the details of the portion of the controller 43 corresponding to position K of shift register 41.

Each position of shift register 41 includes a row of triggers corresponding to the format shown in FIG. 2. For example, FIG. 7e includes a row of triggers $K_d$, $K_o$, $K_{a-n}$, $K_l$ and $K_r$ corresponding to triggers 11–15 respectively in FIG. 2. The triggers in FIGS. 7d and 7f include the same subscripts as the corresponding triggers in FIG. 7e. However, the symbols $(K-1)$ and $(K+1)$ are used to distinguish the triggers in positions $K-1$ and $K+1$ from those in position K of shift register 41.

Each position of output instruction storage 44 includes four rows of triggers corresponding to the format shown in FIG. 3. Each group includes triggers corresponding to triggers 21–24. For example position N shown in FIG. 7b, includes triggers $N_{a-n}$, $N_{1a-1n}$, $N_{oa-on}$ and $N_{ra-rn}$. The same subscripts are used in FIGS. 7a and 7c. However, the triggers in these figures employ the symbols $(N-1)$ and $(N+1)$ to distinguish from position N of output instruction storage 44.

Each term of expression 1 is read into one of the positions of shaft register 41. For example, if position K shown in FIG. 7e receives a data character, trigger $K_d$ is set into the one state, while triggers $K_{a-n}$ are set into a pattern of one and zero states corresponding to the address of the data. If the term of the expression is an operator, then trigger $K_o$ is set in the one state and the type of operator is stored by setting triggers $K_{a-n}$ into a selected pattern of ones and zeros. If the term of the expression is a left parenthesis or a right parenthesis, triggers $K_l$ or $K_r$ respectively are set into the one state. The input signals are applied through a group of lines 51–58 and a cable 59. Lines 51–58 are either connected directly to the triggers of position K in FIG. 7e or indirectly through a group of OR gates 61–65. Similar means are provided for inserting terms of expression 1 into positions $K-1$ and $K+1$ of shift register 41.

Shown in FIG. 7e is a row of AND gates 71–78 which perform the function of shifting the contents of triggers $K_d$ and $K_o$ into triggers $(K+1)_d$ and $(K+1)_o$ and vice versa. An OR gate 79 is connected to reset trigger $K_d$. The group of three gates 80, 81 and 82 selectively couple the outputs of triggers $K_{a-n}$ to output instruction storage 44, while gates 83 and 84 transfer the contents of triggers $K_{a-n}$ into triggers $(K+1)_{a-n}$ and vice versa.

Gates similar to gates 71–84 are provided in positions $(K-1)$ and $(K+1)$ of shift register 41 thereby enabling the terms of expression 1 to be shifted up or down in register 41, or transferred into output instruction storage 44. The details of how these operations are accomplished are explained in connection with FIGS. 7h and 7i illustrating controller 43.

Portions of the inner parenthesis detector 42 relating to position K of shift register 41 are shown in detail in FIG. 7g. Two triggers $K_2$ and $K_1$ are associated with position K of shift register 41, while other triggers $(K-1)_2$ and $(K-1)_1$ are associated with position $K-1$ of register 41 and triggers $(K+1)_2$ and $(K+1)_1$ are associated with position $K+1$ of shift register 41. The subscripts 1 and 2 applied to the triggers in FIG. 7g correspond to rows one and two in FIG. 4. As described in connection with FIG. 4, the triggers of FIG. 7g are set into the one state if a left parenthesis is stored in the corresponding position of shift register 41 and into the zero state if a right parenthesis is stored in the corresponding position. If no parenthesis is stored in a position of shift register 41 then the corresponding triggers in the inner parenthesis detector 42 shown in FIG. 7g are set to agree with the condition of a neighboring trigger in the same row. Specifically the triggers in FIG. 7g with the subscript 2 are made to agree with the upper neighbor corresponding to the left hand neighbor in the second row of FIG. 4, while the triggers in FIG. 7g with a subscript 1 are set in a condition agreeing with their lower neighbor corresponding to the right hand number of the first row in FIG. 4. A group of AND and OR gates 91–96 perform the function of setting trigger $K_2$ in accordance with the rules set out with reference to FIG. 4. Similar groups of AND gates perform the function of setting the other triggers in the inner parenthesis detector 42 partially shown in FIG. 7g. Gates 91–94 receive signals from a group of lines 100–103. AND gates 91 and 92 receive the outputs from the zero sides of triggers $K_l$ and $K_r$ shown in FIG. 7e. Therefore when no parenthesis is stored in the K position of shift register 41 the state of trigger $(K-1)_2$ is passed through gates 91–94 to gates 95 and 96. When a clock pulse is applied at a time $T_1$ to a line 105, AND gates 95 and 96 couple the state of trigger $(K-1)_2$ to trigger $K_2$. This operation is effectively a "carry" from the upper trigger to the lower trigger. The "carry" operation continues to trigger $(K+1)_2$ provided no parenthesis is stored in position $K+1$ of shift register 41.

Returning to the operation of gates 91–96, and assuming a left parenthesis is stored in the K position of shift register 41, a signal appears on line 100 passing through OR gate 93 setting trigger $K_2$ in the one state following a clock pulse on line 105. It may be noted that while a signal is present on line 102 at this time its effects merely to open AND gate 91 which in turn may or may not provide a signal to OR gate 93 according to the setting of trigger $(K-1)_2$. However since OR gate 93 already receives a signal on line 100 a second signal would not alter the operation.

In a like manner, when a right parenthesis is stored in the K position of register 41 a signal appears on line 101 passing through OR gate 94 to set trigger $K_2$ in the zero state.

A group of gates 91'–96' service trigger $K_1$ in the same manner as AND gates 91–96 service trigger $K_2$. This time however the "carry" operation proceeds upward from the trigger $(K+1)_1$. Trigger $(K+1)_2$ is serviced by a group of gates similar to gates 91–96 in response to the outputs from triggers $(K+1)$ and $(K+1)_r$ in FIG. 7f. A pair of AND gates $A_{Kr}$ and $A_{Kl}$ detect the presence of a right or left parenthesis stored in position K of shift register 41. Gate $A_{Kr}$ searches for the group of ones and zeros appearing in block 32, FIG. 4. To accomplish this the zero outputs of triggers $(K-1)_1$, $K_1$ and $K_2$ and the one output of trigger $(K-1)_2$ are connected to AND gate $A_{Kr}$. AND gate $A_{Kl}$ searches for the pattern of ones and zeroes within block 31 of FIG. 4 receiving the "one" outputs from triggers $K_2$, $K_1$ and $(K+1)_2$ and the zero output from trigger $(K+1)_1$.

Each position of shift register 41 has a corresponding pair of AND gates similar to $A_{Kr}$ and $A_{Kl}$ in FIG. 7g which indicate whether a parenthesis is present in the corresponding position of shift register 41. The outputs from these AND gates are fed to controller 43 a portion of which is shown in detail in FIG. 7h. Controller 43 responds to the signals from inner parenthesis detector 42 and controls the shift register 41. Terms of the expression 1 are shifted in register 41 until an operator has two data characters adjacent thereto. At this time the controller 43 causes the operator and two data characters to be transferred into the output instruction storage 44.

FIG. 7h shows the details of the controller 43 associated with the K position of shift register 41. Other portions of controller 43 are shown in broken line form to illustrate the complete operation of the circuit. A column of triggers, $(K-1)_{dwn}$, $K_{dwn}$ and $(K+1)_{dwn}$ control the shifting of terms in register 41 in the downward direction, corresponding to the left to right direction in FIG. 5. Another column of triggers in FIG. 7h, $(K-1)_{up}$, $K_{up}$ and $(K+1)_{up}$ control shifting of information in register 41 in the upward direction, corresponding to the right to left direction in FIG. 5.

Each of the triggers shown in FIG. 7h is serviced by a group of five logic gates, such as gates 110–113 and $A_{dwnK}$ associated with trigger $K_{dwn}$, and gates 110'–113' and $A_{upK}$ associated with trigger $K_{up}$.

All of the triggers in FIG. 7h are assumed to be placed in their reset, or zero, condition initially by suitable means. Signals from the inner parenthesis detector 42 set the triggers of FIG. 7 into the one state. For example, if a left parenthesis is detected, a signal appears on line 120 which conditions one input of AND gate 110. The other input is supplied by a clock pulse at a time $T_2$. The timing of the clock pulses will be described after the complete system has been illustrated. AND gate 110 provides an output which sets trigger $K_{dwn}$ into the one state.

The first event following the setting of trigger $K_{dwn}$ in the one state is to remove the detected left parenthesis stored in the K position of shift register 41. The one output side of trigger $K_{dwn}$ is fed via a line 121 to an OR gate 123 in FIG. 7i which in turn supplies a signal to an AND gate 125. AND gate 125 is conditioned by a clock pulse at a time $T_3$ to provide a signal on a line 127 which is fed back via a cable 129 through OR gate 63 in FIG. 7e to reset trigger $K_1$ thereby removing the left parenthesis term from position K of shift register 41.

The second event following the setting of trigger $K_{dwn}$ FIG. 7h is to set trigger $(K+1)_{dwn}$ into the one state provided two conditions are not present. The first prohibiting condition is that an operator is present in the $K+1$ position of shift register 41. This first prohibiting condition can be illustrated with reference to FIG. 5, operating step number three. The right broken parenthesis adjacent to the data character $c$ is prohibited from shifting to the left because operator $(x)$ is in the next position. While the chart, FIG. 5, step three, illustrates the first prohibiting condition only for the right parenthesis shift, the principle of operation is the same for the left parenthesis shift illustrated in FIG. 7h, between triggers $K_{dwn}$ and trigger $(K+1)_{dwn}$.

The second condition prohibiting shift of the one state of trigger $K_{dwn}$ to trigger $(K+1)_{dwn}$ depends upon the condition of trigger $(K+1)_{dwn}$ and all of the remaining such triggers corresponding to higher order positions of shift register 41 as well as the presence of an operator character in one of the higher order positions of shift register 41. Specifically, no shift from trigger $K_{dwn}$ to trigger $(K+1)_{dwn}$ takes place if trigger $(K+1)_{dwn}$ is already in the one state and an operator exists in the $K+2$ position of shift register 41. A variation of this second prohibiting condition is where a plurality of consecutive higher order triggers such as trigger $(K+1)_{dwn}$ is in the one state followed by the presence of an operator in the next highest order position of shift register 43. While this condition is not directly illustrated in the chart of FIG. 5, it is equivalent to the presence of a number of right parentheses adjacent to the broken right parenthesis at operating step three. Where a number of such parentheses is lined up to the right of operator $(x)$ no shift can take place.

Returning to the detailed description of controller 43 shown in FIG. 7h, the output from trigger $K_{dwn}$ is applied to AND gate $A_{dwnK}$. Another input to gate $A_{dwnK}$ is a clock pulse at a time $T_4$. The third input which must exist in order to condition gate $A_{dwnK}$ is supplied by inverter 111. Inverter 111 is supplied via an OR gate 112 with the signal on a line 131 connected to the one output side of trigger $(K+1)_0$ shown in FIG. 7f. Therefore when an operator is present in the $K+1$ position of shift register 41 a signal is supplied via line 131 through OR gate 112 to inverter 111 which in turn inverts the signal and blocks gate $A_{dwnK}$, in accordance with the first prohibiting condition described above.

The second input to OR gate 112 is supplied by AND gate 113. One input to AND gate 113 is supplied via a line 133 from the one ouput side of trigger $(K+1)_{dwn}$. The other input to AND gate 113 is supplied via a line 135 which is connected to an OR gate in the $K+1$ position of controller 43 similar to the manner that a line 135' is connected to OR gate 112. Therefore a signal appears on line 135 when the $K+2$ position of shift register 41 contains an operator or a higher order position of shift register 43 contains an operator and the triggers in controller 43 corresponding to the intermediate positions of shift register 41 are in the one state. The signals on lines 135 and 135' propagate upward inhibiting the transfer of one state conditions in a downward direction in accordance with the second prohibiting condition described above.

When all three inputs to AND gate $A_{dwnK}$ are present a signal is provided on a line 137 which returns to the reset side of trigger $K_{dwn}$ and also sets trigger $(K+1)_{dwn}$. The signal on line 137 is fed back through cable 129 to position K of shift register 41 causing the contents of position K to shift to position $K+1$ by conditioning gates 71, 72, 75, 76 and 83. AND gates 73, 74, 77, 78 and 84 shift the contents of position $K+1$ to position K of shift register 41 in response to a signal on a line 138 from AND gate $A_{upK}$ in FIG. 7h. Each position of shift register 41 receives two signals controlling the direction in which information shifts. The two signals are supplied by AND gates such as $A_{dwnK}$ and $A_{upK}$ in controller 43. These AND gates are designated in FIGS. 7d and 7f with the same symbol, except the letter K is charged to $(K+1)$ or $(K-1)$. The connections to AND gate $A_{upK}$ are shown in detail in FIG. 7h.

One condition remains to be described in connection with the operation of controller 43 shown in FIGS. 7h and 7i. This condition occurs when an operator stored in shift register 41 has a pair of data characters stored in adjacent positions as illustrated in FIG. 5 during operating step one. Detection of this condition is accomplished by an AND gate $A_K$ shown in FIG. 7i. One input is received on a line 151 from the one input side of trigger $K_o$. A signal on line 151 indicates the presence of an operator stored in the K position of shift register 41. Two other inputs applied to AND gate $A_K$ arrive on a pair of lines 152 and 153 connected to the one output sides of triggers $(K+1)_{up}$ and $(K-1)_{dwn}$ respectively. A fourth input is the clock pulse at time $T_1$. The presence of all four inputs to AND gate $A_K$ indicates that an instruction is ready to be transferred to the output instruction storage 44. The output from AND gate $A_K$ is supplied via a line 155 through cable 129 to gates 61, 62 and 81 in FIG. 7e. Conditioning of gate 82 transfers the operator stored in triggers $K_{a-n}$ via a cable 157 to the output instruction storage 44. The signal passing through OR gate 62 resets trigger $K_o$, while the signal through gate 61 sets trigger $K_d$.

As described in chart 5, operating step two, the address in the computer where the result of the operation is to be stored replaces the operator in the corresponding position of shift register 41. This is accomplished by a signal on line 155 in FIG. 7i which is applied to a gate 161. Gate 161 receives a combination of two signals. The first is from a binary counter 163 which counts the number of clock pulses $T_4$ appearing since the initial operation. The second portion of the signal applied to gate 161 comes from a signal generator $N_K$ which generates a plurality of binary signals selected to identify position K of shift register 41. Therefore the output of gate 161 appearing on a cable 163 is a unique combination of signals representing the time at which the operation is transferred from the shift register 41 to the output instruction storage 44 as well as the position in the shift register 41 from which the operator is transferred. In this manner a unique address is provided for the results of each instruction stored in storage 44. The address from gate 161 is passed through a delay 165 providing a delayed signal on a cable 163′. Both cables 163 and 163′ are connected to position K of shift register 41 via cable 129. The delayed address signal on cable 163′ passes through OR gate 65 and is stored in triggers $K_{a-n}$, the delay permitting the prior readout of the operator from these triggers. The address signal on cable 163 is fed through the K position of shift register 43 to output instruction storage 44.

The signal from AND gate $A_K$ on line 155 is also fed to positions $K-1$ and $K+1$ of shift register 41. In position $K-1$, FIG. 7d, line 155 is connected to a gate 82′ thereby coupling the contents of triggers $(K-1)_{a-n}$ to output instruction storage 44. Line 155 is also connected through an OR gate 79′ to reset trigger $(K-1)_d$. At this time no terms of the expression 1 are stored in the $K-1$ position of shift register 43.

The line 155 is also connected to FIG. 7f to a gate 80′ which couples the data character stored in triggers $(K+1)_{a-n}$ to the output instruction storage 44. An OR gate 79″ couples the signal on line 155 to the reset input of trigger $(K+1)_d$.

Each position of register 41 has an associated AND gate in the controller 43 such as AND gate $A_K$. These AND gates control the read out of shift register 41 as indicated by the symbols $A_{K-2}$–$A_{K+2}$ in FIGS. 7d–f.

Details of output instruction storage

As shown in FIG. 6, each position of output instruction storage 44 services three positions of shift register 41 since three characters of the expression 1 must be combined to form a single output instruction. The details of position N of output instruction storage 44 are shown in FIG. 7b. Four groups of triggers $N_{a-n}$, $N_{1a-1n}$, $N_{ca-cn}$ and $N_{ra-rn}$ store respectively, the address in the computer where the results are to be stored, the data character to the left of the operator, the operator, and the data character to the right of the operator. The four groups of triggers are serviced by four OR gates 171–174, respectively. OR gates 171 and 173 receive cables connected to all three positions of shift register 41 shown in FIGS. 7d–f. Therefore if the operator is stored in any one of these three positions it can be transferred into output instruction storage position N via OR gate 173. When the operator is in position K of shift register 41 the operator signal is received via cable 157 and the result via cable 163. When the operator is in position $K-1$ the operator and the result are received via a pair of cables 181 and 182 respectively. If the operator is in the $K+1$ position of shift register 41 the operator is received via a cable 183 and the result via a cable 184.

OR gate 172 receives the data character to the left of the operator which can come from positions K, $K-1$ or $K-2$ of shift register 41. When the operator is in the $K+1$ position the data character on the left is received from position K via a cable 185. If the operator character is in the K position, the data character to the left thereof is received from position $K-1$ via a cable 186. The signal on cable 186 is provided by gate 82′ in FIG. 7d in response to the signal on line 155 as described in detail above. Finally if the operation is in position $K-1$ of shift register 41, then OR gate 172 receives the data character on the left thereof from position $K-2$ (not shown).

The remaining OR gate 174 shown in FIG. 7b receives the data characters on the right of the operator. When the operator is in the $K-1$ position, the data character on the right is received from the K position via a cable 187. If the operator character is in the K position of shift register 41 the data character on the right thereof is received from position $K+1$ via a cable 188 connected to the output of gate 80′, FIG. 7f, which is conditioned by the signal on line 155 as described in detail above. Finally when the operator character is stored in the $K+1$ position of shift register 41 the data character on the right thereof is received from the $K+2$ position (not shown).

The remaining two connections are made between the positions of shift register 41 shown in FIGS. 7d–e and positions $N-1$ and $N+1$ of the output instruction storage 44. One of the remaining two connections is a cable 189 connected between position $K-1$ of the shift register 41 and an OR gate 174′ in FIG. 7a. When the operator is in the $K-2$ position of shift register 41, the data character on the right is transferred from position $K-1$ via cable 189 to position $N-1$ of output instruction storage 44.

The last connection to be described is a cable 190 in FIG. 7c coupling the data character on the left of an operator character stored in position $K+2$ (not shown) of shift register 41 from the $K+1$ position to an OR gate 172′ in FIG. 7c. Other connections to positions $N-1$ and $N+1$ of output instruction storage 44 are illustrated in broken lines.

Summary

Throughout the detailed description above clock pulses appearing at times $T_1$, $T_2$, $T_3$ and $T_4$ conditioned various gates. In summarizing, the operation of the system will be related to the four clock pulses forming a complete clock cycle.

At time $T_1$ the gates of inner parenthesis detector shown in FIG. 7g are activated causing the transfer of information from shift register 41 and the detection of all inner parentheses. At the same time AND gate $A_K$ in FIG. 7i and all related AND gates in controller 43 are conditioned by a clock pulse at time $T_1$ initiating the read out of characters from shift register 41 to output instruction storage 44.

At time $T_2$ the output from inner parenthesis detector 42 is transferred into controller 43 setting the triggers therein.

At time $T_3$ signals are fed back via line 127 and other similar outputs from controller 43 to reset triggers $K_1$ and $K_r$ thereby removing the detected parenthesis terms from the shift register 41.

At time $T_4$ the contents of the triggers in controller 43 shown in FIG. 7h are shifted up or down causing the characters stored in the corresponding positions of shift register 41 to be shifted in a like direction. At this time the cycle of operation is completed and the system is ready for the next clock pulse at time $T_1$ initiating another operating step.

Each of the operating steps shown in FIG. 5 includes four clock pulses. The operating steps continue until all of the characters have been transferred from the shift register 41 to the output instruction storage 44. This final operation may be detected by observing the state of trigger $K_0$ and all other similar triggers in shift register 41. Accordingly the one output state of trigger $K_0$ is connected via line 151 to an OR gate 200. The one output sides of triggers $(K-1)_0$ and $(K+1)_0$ are connected via a line 201 and line 131 respectively to OR gate 200. OR gate 200 continues to supply a signal to an inverter 202 until all of the input signals are absent. At this time inverter 202 provides a signal to an end of operation indicator 203.

While the invention has been described with regard to an algebraic expression 1 containing parentheses, it is apparent that the same apparatus could be used to detect any identification marks. Also, the operators need not be mathematical operations but could represent symbolic manipulation involving inequalities, intersections or other linkages, or manipulation of Boolean expressions.

Further, the output instructions need not be placed in a digital storage 44 but could be printed out directly to serve as a guide for later programming of a computer. A computer can similarly execute the instructions as they are generated. Still another modification could be made to the manner of developing a unique address in which to store the result $R_1$. Any manner of generating addresses is suitable provided there is a correspondence between the operation in its proper order of precedence and the place where the result can be found for later use.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for translating an input statement containing a series of characters and interspersed pairs of indication marks, each pair having at least one character located therebetween, into a plurality of output expressions, each expression being determined by the characters located between said pairs, comprising:
    register means for storing said input statement;
    detecting means for simultaneously interrogating said storage means and identifying all inner pairs having only characters located therebetween;
    output means for providing machine expressions corresponding to the characters between respective identified inner pairs;
    control means for removing said inner pairs and the characters located therebetween from said register means; and
    said detecting means including means to identify new inner pairs having only characters located therebetween.

2. Apparatus as defined in claim 1 wherein said control means includes means for inserting a substitute character in said register means for each group of characters removed therefrom so that said output means subsequently provides expressions corresponding to the original characters and substitute characters between said new inner pairs.

3. Apparatus for translating an input statement containing a series of characters and interspersed pairs of identification marks, each pair having at least one character located therebetween, into a plurality of output expressions, each expression being determined by the characters located between said pairs, comprising:
    shift register means including an individual position for storing each character and mark in said input statement;
    detecting means for simultaneously interrogating said storage means and identifying all inner pairs having only characters located therebetween;
    output means for providing expressions corresponding to the characters between said identified inner pairs;
    control means for removing said inner pairs and the characters located therebetween from said shift register means and inserting a substitute character therefor at a single position of said register means, said control means including further means for shifting the position of the remaining characters and marks stored in said register means until the empty positions formed by the removal of said inner pairs and the characters therebetween have been filed; and
    said detecting means including means for reinterrogating said shift register means to identify new inner pairs whereby said output means provides expressions corresponding to the characters and substitute characters between said new inner pairs.

4. An algebraic instruction generator for accepting an algebraic statement containing a series of operator characters and data characters and interspersed pairs of left and right parentheses, each pair having at least one operator character and one data character located therebetween, and for providing a plurality of output instructions, each instruction being determined by the characters located between said pairs, comprising:
    shift register means including an individual position for storing each character and parenthesis in said input statement;
    detecting means for simultaneously interrogating said register means and identifying all inner pairs of left and right parentheses having only operator and data characters located therebetween;
    output means for providing expressions corresponding to the characters between said identified pairs; and
    control means for removing said inner pairs and the characters located therebetween from said register means and inserting a substitute character therefor at a single position of said register means, said control means including further means for shifting data characters and substitute characters into positions of said register adjacent to positions occupied by said operator characters, whereby said output means provides expressions corresponding to operator characters and the adjacent data and substitute character.

5. Apparatus as defined in claim 4 wherein said detecting means includes means for subsequently identifying new inner pairs containing only data characters, operator characters or substitute characters each time said control means removes a previously identified inner pair.

6. Apparatus as defined in claim 5 wherein said control means removes identified pairs and shifts the position of characters in said register only after a parenthesis occupying an adjacent position thereto in said register has been identified.

7. Apparatus for detecting inner pairs of parentheses in an algebraic statement containing a series of characters and pairs of interspersed left and right parentheses, comprising:

a first and a second row of bistable devices each having a one and a zero state, each of said rows including one device corresponding to each character and parentheses in said algebraic statement;

coupling means for setting all devices corresponding to left parentheses in the one state and all devices corresponding to right parentheses into the zero state;

carry means for setting the state of the remaining devices in said first row into the same state as the adjacent device on the right, and for setting the state of the remaining devices in said second row into the same state as the adjacent device on the left;

a left parenthesis locator responsive to the simultaneous occurrence of a first device in said first row set in the one state, a second device in said first row on the right side of said first device set in the zero state, and a third and fourth device in said second row corresponding to the same character and parenthesis as said first and second devices both set in the one state; and a right parenthesis locator responsive to the simultaneous occurrence of a fifth device in said second row set in the zero state, a sixth device in said second row on the left side of said fifth device set in the one state, and a seventh and eighth device in said first row corresponding to the same character and parenthesis as said fifth and sixth devices both set in the zero state.

8. Apparatus for translating an input statement containing a series of characters and interspersed pairs of left and right parentheses, each pair having at least one character located therebetween into a plurality of output instructions, each instruction being determined by the characters located between said pairs, comprising:

register means including an individual position for storing each character and parenthesis in said algebraic statement;

detecting means for identifying inner pairs of parentheses in said algebraic statement, including, a first and a second row of bistable devices each having a one and a zero state, each of said rows including one device corresponding to each position of said register, coupling means for setting all devices having a left parenthesis in the corresponding position of said register into the one state and all devices having a right parenthesis in the corresponding position of said register into the zero state, carry means for setting the state of the remaining devices in said first row in the same state as the adjacent device on the right, and for setting the state of the remaining devices in said second row in the same state as the adjacent device on the left, a left parenthesis locator responsive to the simultaneous occurrence of a first device in said first row set in the one state, a second device in said first row on the right side of said first device set in the zero state, and the third and fourth device in said second row corresponding to the same positions of said register as said first and second devices both set in the one state, and a right parenthesis locator responsive to the simultaneous occurrence of a fifth device in said second row set in the zero state, a sixth device in said second row on the left side of said fifth device set in the one state, and a seventh and eighth device in said first row corresponding to the same positions of said register as said fifth and sixth devices both set in the zero state;

output means for providing expressions corresponding to the characters between the pairs of left and right parentheses identified by said detecting means; and control means for removing said inner pairs and the characters located therebetween from said register means and for resetting said rows of bistable devices to locate a new inner pair of left and right parentheses.

No references cited.

MAYNARD R. WILBUR, *Primary Examiner.*

W. J. KOPACZ, *Assistant Examiner.*